UNITED STATES PATENT OFFICE.

FRANK B. MARTIN, OF BATTLE CREEK, MICHIGAN, ASSIGNOR TO POSTUM CEREAL CO., LTD., OF BATTLE CREEK, MICHIGAN, A COPARTNERSHIP ASSOCIATION, LIMITED.

PUFFED CEREAL FLAKE.

1,161,323.      Specification of Letters Patent.      Patented Nov. 23, 1915.

No Drawing.      Application filed April 29, 1915. Serial No. 24,798.

*To all whom it may concern:*

Be it known that I, FRANK B. MARTIN, residing at Battle Creek, Michigan, have invented a new and useful Improvement in Puffed Cereal Flakes, which invention is fully set forth in the following specification.

This invention relates to flaked cereal products such, for example, as corn flakes, and to the method of making the same, and has for its object to provide cooked puffed cereal flakes ready for consumption as food for human beings, and which shall be non-hygroscopic to a marked degree, and which shall not deteriorate under ordinary climatic changes.

Flaked cereal products as heretofore prepared are prone to deteriorate under atmospheric conditions, to lose their crispness, and when served with milk or cream, to become soggy, a condition which is objectionable to many users. By my invention, I provide a new food product consisting of a mass of uniformly puffed, roasted cereal flakes which are peculiarly palatable, and which overcome the above objections; and I also provide a new and improved process of making the same. I take the cereal, which may be in the form of grits, such as corn grits, and preferably season the same with salt and a sweetening agent, as sugar, and place them, in an air-dry state, in a cooker, together with a sufficient quantity of water to soften the same during the cooking operation, and cook the same by the application of heat. Preferably, the cooking operation is conducted in a steam-tight cooker, and the cereal is agitated during the cooking operation. The amount of water and the extent of cooking should be such as to more or less effectually cook the grains, while at the same time permitting each grain to retain its identity. The amount of water, the degree of heat and the length of time during which this cooking operation is continued will depend more or less upon the kind and condition of the grain employed. If the grain is very dry, it will require slightly more water than grain containing some natural moisture, and some grains will require to be cooked longer than others. After the grain has been sufficiently cooked, preferably under steam pressure, it is removed from the cooker and deprived of extraneous moisture by drying. This drying step, however, is not carried far enough to entirely dry the grain, a considerable portion of the moisture remaining on the interior thereof. In this condition, the grains will have a partially dried, tough exterior portion and will not stick together. The grains are next placed in curing tubs or bins, preferably at room temperature, where they are permitted to remain for a sufficient length of time to cause the moisture on the interior portion of the grain to be evenly distributed through the entire grain, thus uniformly curing or toughening the whole. When corn grits are being treated, I have found that this curing step usually requires from ten to fourteen hours. This treatment results in developing a tough, leathery condition of the granules throughout the body thereof, and prepares them for the flaking operation.

For the purpose of flaking, water-cooled smooth-surfaced rolls are employed, which are spaced a sufficient distance apart to produce a flake having a considerable thickness or body, rather than the very thin, shaving-like flake produced in some processes heretofore practised. The toughened grains are fed to the rolls in such manner that each grain has ample space for flattening out without overlapping another grain. Preferably, the rolls are driven at the same surface speed, and act to roll the kernels into flakes, while preserving, as far as possible, the continuity of their tough surfaces. From the rolls, the flakes thus produced are conducted to a roasting apparatus, wherein they are baked or roasted in such a manner as to produce a large number of minute puffs or bubbles upon the opposite surfaces of all of the flakes. This is accomplished by first subjecting the flakes to a temperature which acts to quickly form an exterior partially-cooked film on the outside of the flakes before the moisture contained within the interior of the body of the flakes escapes, and then quickly subjecting the flakes to a higher temperature, whereby the moisture on the interior of the body is converted into steam, and in forcing its way outward through the exterior film produces little puffs or bubbles upon the surface. The roasting operation is then continued, preferably under a slight and gradual decrease of temperature, until the desired degree of roasting is attained, after which the roasted puffed flakes are conducted away by any suitable carrier to the packing or storing room.

Preferably, the puffing and roasting action is carried out in a roasting apparatus such, for example, as an inclined revoluble drum, preferably perforated and heated by open flame, and provided with internal fins or ribs which lift the flakes as the drum revolves, and showers them through the heated atmosphere within the drum. Preferably heat is so regulated that the flakes enter a zone of temperature of about 300° F., then pass into a zone of temperature of about 440° F., and leave the drum at a temperature of about 380° F. In the first zone, the action of the heat is to form an exterior film upon the surfaces of the flakes by which film the moisture in the body of the flake is occluded. This film is the result of the quick and partial roasting or searing of the surfaces. The flakes then enter the next and hottest zone, where vaporization of the moisture confined by the film surfaces develops pressure which bursts outward through the film-covering, forming a multiplicity of little bubbles or puffs on the opposite faces of the flakes, giving the flakes a uniform puffed appearance. The puffed flakes are then passed through a heat zone of somewhat reduced temperature, where the final roasting or baking occurs, after which they are delivered into the atmosphere. The result is a product of great uniformity in which each flake of the mass is evenly puffed and toasted; and, if a sweetening agent has been employed, the same is caramelized by the roasting. The flakes have a uniform color, preferably slightly brown, are very crisp, and retain their crispness under ordinary atmospheric conditions for a long period of time. They resist the absorption of liquids, and therefore remain crisp after being served with milk or cream, and do not quickly become soggy.

As a specific example, I place in a steam-jacketed cooker 1500 pounds of white corn grits, together with 40 pounds of salt, 50 pounds of cane sugar, and from 50 to 60 gallons of water, depending upon the moisture in the corn. The mass is then heated under about 15 pounds steam pressure, or at a temperature of about 250° F., for about 4 hours, more or less depending upon the character of the corn. After being removed from the cooker, the grits are dried until the surfaces of the grains are dried to a leathery condition, while leaving the centers of the grains still moist. Preferably, this drying step is accomplished by passing the cooked grits through the meshes of a revolving reel, whereby the surfaces are partially dried and the individual grains separated, so that they will not adhere to each other, after which they are conveyed to any suitable drier for drying grains or granular substances, where the drying process is continued until the leathery condition of the exterior surfaces is obtained, while leaving the interior of the grains in a moist condition, as mentioned above. When this condition is secured, the product is placed in vats or bins, which are kept covered, preferably with a textile cover, where they remain for from 10 to 14 hours, while the temperature of the mass is maintained at approximately a room temperature of about 70° F. As a result of this treatment, the moisture on the interior of the grains is evenly distributed throughout the entire mass of the same, and the whole grain becomes uniformly tough and leathery. After this curing or toughening operation, the grain is fed through water-cooled flaking rolls of the character described above, and leaves the rolls in the form of flattened disks or thick flakes, which are fed directly into an inclined revoluble drum, provided with interiorly projecting fins or ribs. The walls of the drum are perforated and heated by gas flames so arranged and regulated that zones of temperature are maintained therein, as above described, and the drum itself is preferably inclosed in a casing of sheet metal covered with asbestos. For handling the flakes in quantities, a drum about 20 feet long, 38 inches in diameter, and making about 120 revolutions per minute has been found suitable. The flakes remain in the roaster for about three minutes from the time they enter until they are discharged. The flakes thus produced are more crisp after they have been exposed to the atmosphere for a few moments, even when the air is moist, than they are when they leave the roaster, and resist moisture in a characteristic manner, due, it is believed, to the short time of exposure over a long path in a highly heated state.

While I have specifically described the invention in connection with the manufacture of puffed corn flakes, it is to be understood that the invention is not limited to the treatment of corn or Indian maize, but is equally applicable to other grains, such as rice, which are capable of being treated in the form of integral grains or cracked or broken portions thereof, as distinguished from said grains when reduced to the condition of flour or starch.

What is claimed is:—

1. The method of treating cereals which consists in forming the same into moisture-containing flakes having an appreciable thickness or body, then forming a film on the exterior surfaces of the flakes, and then puffing the flakes by heat.

2. The method of treating cereals which consists in forming the same into moisture-containing flakes, occluding moisture within the flakes by converting the exterior surfaces of the flakes into a tough film, and then puffing the flakes by applying heat sufficient to convert the occluded moisture into steam.

3. The method of treating cereals which consists in flaking the cereal, subjecting the flakes to the action of heat at a temperature and for a length of time to affect the exterior surfaces only of the flakes, and then quickly subjecting said flakes to a higher temperature.

4. The method of making puffed cereal flakes which consists in cooking the grains in the presence of moisture, partially drying and then evenly distributing the remaining moisture throughout the grains, flaking the grains, and then passing the flakes first through a quickly increasing and then a gradually decreasing temperature.

5. The method of making puffed cereal flakes which consists in cooking the grains under steam pressure, toughening the granules, flaking the same, searing the flake surfaces, and then puffing the flakes by heat.

6. The method of making puffed cereal flakes which consists in cooking the grains under pressure, partially drying the same, permitting the partially dried grains to stand in a mass to uniformly distribute the moisture through the grains and toughen the same, flaking the grains, and then subjecting the flakes to a progressively increasing temperature to puff them.

7. The method of treating cereals which consists in cooking the cereal in the presence of moisture, flaking the cooked grains, converting the exterior surfaces of the flakes into a tough film by the action of heat, and then puffing the flakes by quickly subjecting the flakes to a higher temperature.

8. The method of treating cereals which consists in cooking the cereal in the presence of moisture, partially drying and toughening the cooked grains, then flaking the same, then forming a film on the exterior surface of the flakes by the action of heat, and then puffing the flakes by the application of a higher degree of heat.

9. The method of making puffed cereal flakes which consists in steam cooking the cereal under pressure, surface drying the grains and then permitting them to stand to distribute the remaining moisture throughout the grains whereby they are toughened, flaking the granules, and then subjecting the flakes to a progressively increasing temperature to puff them.

10. The method of treating cereals which consists in cooking the grains in the presence of moisture and under steam pressure, partially drying the cooked grains, permitting them to stand to more evenly distribute the moisture throughout the grains, flaking the grains, then subjecting the flakes momentarily to a temperature of approximately 300° F., and then quickly subjecting them to a temperature of approximately 440° F. to puff them.

11. The method of treating cereals which consists in cooking the cereal in the presence of moisture, then drying the exterior surface of the cereal, then uniformly toughening the same by permitting the partially dried grains to stand until the moisture is evenly distributed throughout the mass of each grain, then flaking the grains, then forming a film on the exterior of the flakes by heat, and then quickly subjecting the same to a higher degree of heat to puff the flakes.

12. The method of treating cereals which consists in cooking and evenly toughening the grains, and then flaking the same, forming a film on the flakes at one degree of temperature and then quickly subjecting the flakes to a higher degree of temperature to puff the same.

13. The method of treating cereals which consists in cooking the grains in the presence of moisture, partially drying the grains by surface evaporation, then evenly distributing the remaining moisture throughout the grains, then flaking the grains, then subjecting the flakes to heat to form a covering film for the contained moisture and then to a higher heat to puff the flakes.

14. The method of treating cereals which consists in cooking the grains in the presence of moisture, partially drying the grains by surface evaporation, then evenly distributing the remaining moisture throughout the grains, flaking the grains, and then forming a plurality of puffs on the opposite faces of the flakes by the action of heat.

15. The method of treating cereals which consists in cooking the grains in the presence of moisture, evenly toughening the grains by partially drying and uniformly distributing the remaining moisture throughout the grains, flaking the grains, and then forming a plurality of puffs on the opposite faces of the grains by subjecting the flakes first to a searing or film-forming temperature and then quickly increasing the temperature.

16. A food product consisting of a uniform mass of evenly puffed cereal flakes.

17. A food product consisting of a uniform mass of evenly puffed corn flakes.

18. A food product consisting of a uniform mass of evenly puffed, toasted cereal flakes.

19. A food product consisting of a uniform mass of evenly puffed, toasted corn flakes.

20. A food product consisting of a uniform mass of evenly puffed cereal flakes containing a caramelized saccharine substance.

21. A food product consisting of a uniform mass of evenly puffed corn flakes containing a caramelized saccharine substance.

22. A food product consisting of a mass of toasted cereal flakes each flake of which has a plurality of puffs on its opposite sides.

23. A food product consisting of a mass of toasted corn flakes each flake of which has a plurality of puffs on its opposite sides.

In testimony whereof I have signed this specification in the presence of two subscribing witnesses.

FRANK B. MARTIN.

Witnesses:
 Lon E. Willson,
 Vern D. Sutton.